(12) United States Patent
Saito et al.

(10) Patent No.: US 7,748,925 B2
(45) Date of Patent: Jul. 6, 2010

(54) ROTATING MEMBER FIXING STRUCTURE

(75) Inventors: Atsushi Saito, Nagoya (JP); Masaki Omoto, Nishikasugai-gun (JP); Masahiro Azumaya, Nagoya (JP); Toshiaki Horiba, Chita (JP)

(73) Assignee: Aichi Machine Industry Co., Ltd., Nagoya-shi (JP)

( * ) Notice: Subject to any disclaimer, the term of this patent is extended or adjusted under 35 U.S.C. 154(b) by 212 days.

(21) Appl. No.: 11/774,156

(22) Filed: Jul. 6, 2007

(65) Prior Publication Data

US 2008/0069636 A1     Mar. 20, 2008

(30) Foreign Application Priority Data

Sep. 15, 2006   (JP)   ............... 2006-251846

(51) Int. Cl.
*F16C 3/00* (2006.01)
(52) U.S. Cl. ................ 403/359.5; 403/359.6
(58) Field of Classification Search ........... 403/359.1, 403/359.2, 359.5, 359.6
See application file for complete search history.

(56) References Cited

U.S. PATENT DOCUMENTS

| 4,886,392 A | * | 12/1989 | Iio | ............... 403/282 |
| 6,865,776 B2 | * | 3/2005 | Spinelli | ........... 403/359.1 |
| 7,387,462 B2 | * | 6/2008 | Hacker | ........... 403/359.6 |
| 2006/0075838 A1 | | 4/2006 | Hacker | |

FOREIGN PATENT DOCUMENTS

| DE | 103 16 155 A1 | 12/2003 |
| FR | 2 244 935 A1 | 4/1975 |
| JP | 3433656 B | 5/2003 |

\* cited by examiner

*Primary Examiner*—Michael P Ferguson
(74) *Attorney, Agent, or Firm*—Global IP Counselors, LLP

(57) ABSTRACT

A rotating member fixing structure includes a shaft member and a rotating member. The rotating member has an axial bore section press-fitted to the shaft member. One of the shaft member and the axial bore section of the rotating member includes a margin adjusting part dimensioned to reduce a press-fitting margin between the shaft member and the axial bore section of the rotating member from an initial press-fitting margin to an effective press-fitting margin that is less than or equal to a prescribed value when the rotating member is press-fitted to the shaft member.

11 Claims, 7 Drawing Sheets

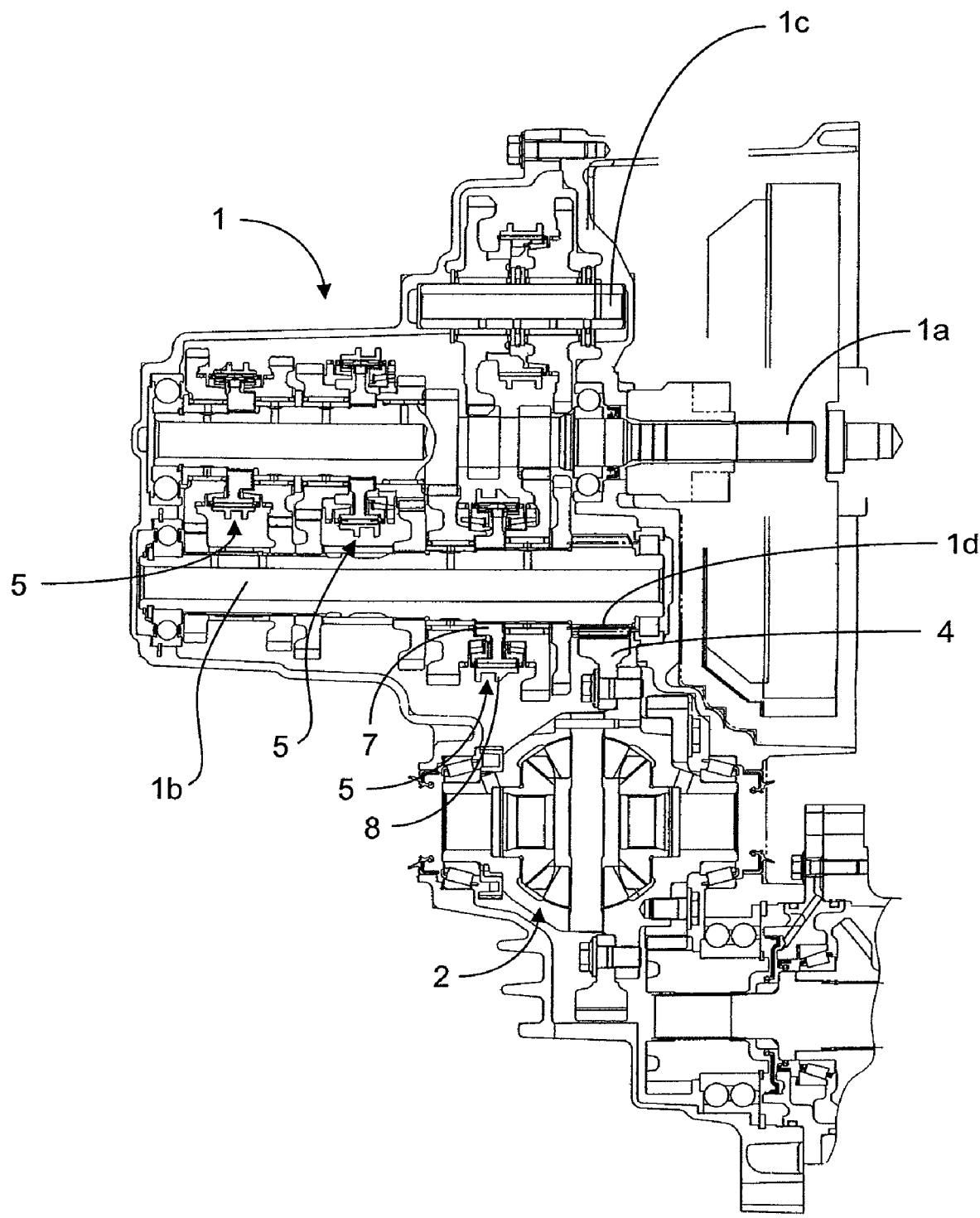
F I G. 1

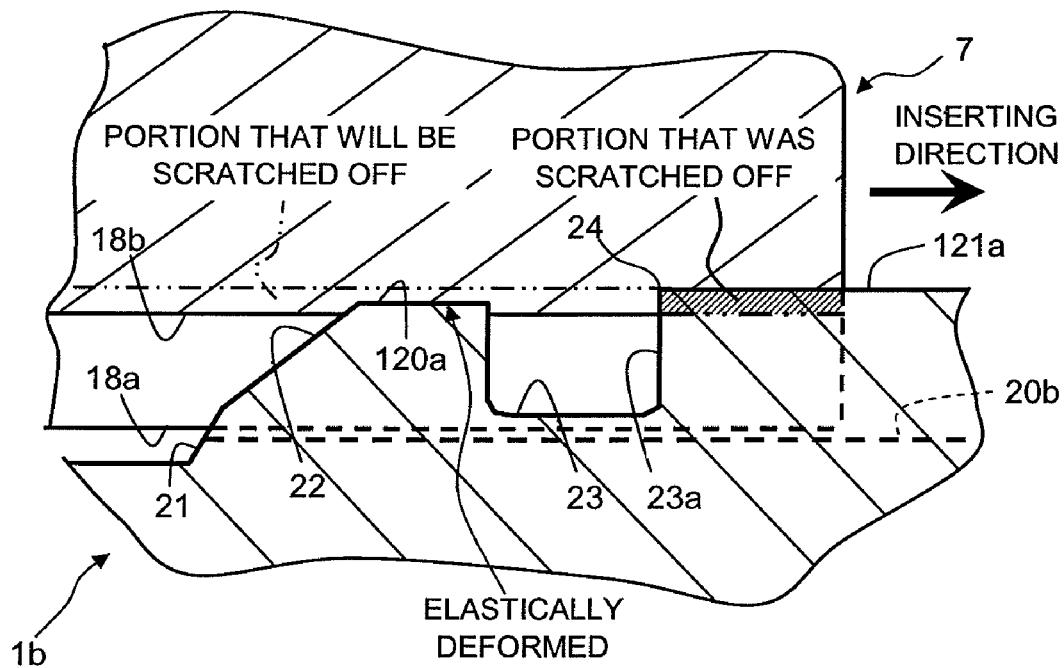
F I G. 3
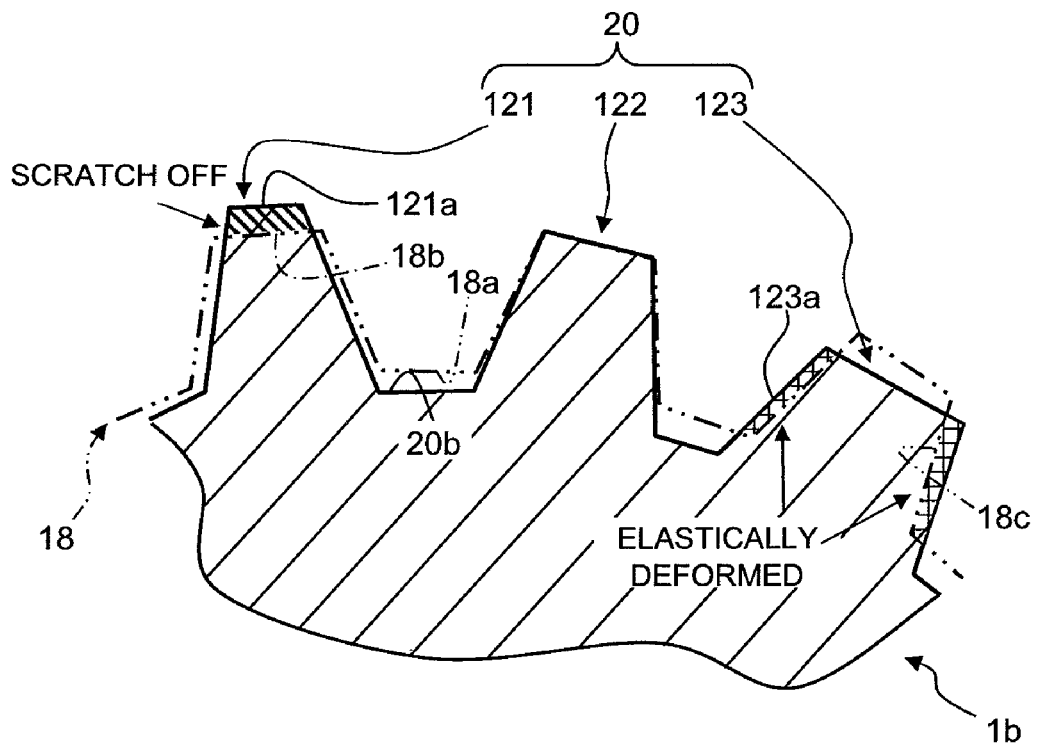
F I G. 4

ROTATING MEMBER FIXING STRUCTURE

CROSS-REFERENCE TO RELATED APPLICATIONS

This application claims priority to Japanese Patent Application No. 2006-251846 filed on Sep. 15, 2006. The entire disclosure of Japanese Patent Application No. 2006-251846 is hereby incorporated herein by reference.

BACKGROUND OF THE INVENTION

1. Field of the Invention

The present invention relates to a rotating member fixing structure for fixedly coupling a rotating member to a shaft member.

2. Background Information

Japanese Patent No. 3433656 discloses a conventional rotating member fixing structure in which an internal teeth part formed on an inner circumferential surface of a ring (a rotating member) and an external teeth part formed on an outer circumferential surface of a spline shaft are fixed together by press-fitting. In the conventional rotating member fixing structure, first press-fitting sections for press-fitting a tip surface of the external teeth part and a bottom surface of the internal teeth part are provided as being spaced apart in the circumferential direction. Also, second press-fitting sections for press-fitting surfaces of the internal and external teeth parts other than the surfaces press-fitted by the first press-fitting sections are provided as being spaced apart in the circumferential direction.

In view of the above, it will be apparent to those skilled in the art from this disclosure that there exists a need for an improved rotating member fixing structure. This invention addresses this need in the art as well as other needs, which will become apparent to those skilled in the art from this disclosure.

SUMMARY OF THE INVENTION

When the internal and external teeth parts are press-fitted together in the conventional rotating member fixing structure as disclosed in the above mentioned reference, the first press-fitting sections and the second press fitting sections are usually plastically deformed in a radial direction. However, an axis displacement between a center axis of the ring (the rotating member) and a center axis of the spline shaft in a radial direction may occur when the ring is placed on the spline shaft. In such case, the press-fitting margin (interference) between the tip surface of the external teeth part and the bottom surface of the internal teeth part varies in different locations in the circumferential direction. Therefore, localized concentrations of stress may occur in the radial direction on the inner circumferential surface of the ring, and the internal teeth part and/or the external teeth part may unexpectedly break due to the localized concentration of the stress.

The present invention was contrived in the light of the aforementioned problems in the prior art. One object of the present invention is to provide a rotating member fixing structure that can minimize the occurrence of localized concentrations of stress. Another object of the present invention is to provide a rotating member fixing structure that can minimize the occurrence of localized concentrations of stress using a simple structure.

In order to achieve the above mentioned objects of the present invention, a rotating member fixing structure includes a shaft member and a rotating member. The rotating member has an axial bore section press-fitted to the shaft member. One of the shaft member and the axial bore section of the rotating member includes a margin adjusting part dimensioned to reduce a press-fitting margin between the shaft member and the axial bore section of the rotating member from an initial press-fitting margin to an effective press-fitting margin that is less than or equal to a prescribed value when the rotating member is press-fitted to the shaft member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 1 is a partial axial cross sectional view of a transmission including a rotating member fixing structure in accordance with a first embodiment of the present invention;

FIG. 3 is an enlarged partial axial cross sectional view of a spline engagement portion between the rotating member and the shaft member illustrating a state in which the rotating member is being inserted to the shaft member in accordance with the first embodiment of the present invention;

FIG. 4 is an enlarged partial transverse cross sectional view of the spline engagement portion between the rotating member and the shaft member in accordance with the first embodiment of the present invention;

DETAILED DESCRIPTION OF THE PREFERRED EMBODIMENTS

Figure 2:
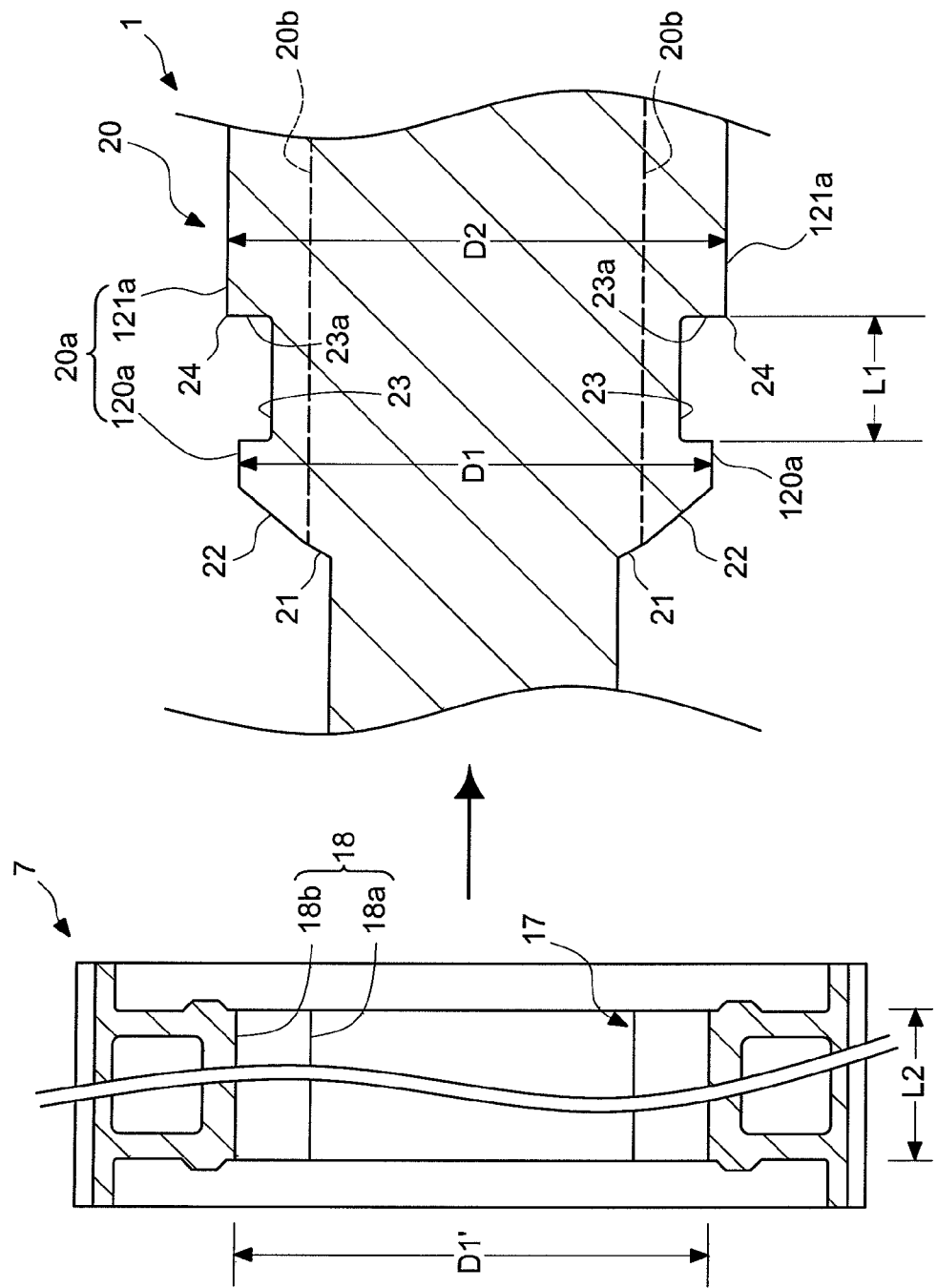
FIG. 2 is an enlarged partial axial cross sectional view of a rotating member and a shaft member of the rotating member fixing structure showing a state before the rotating member is press-fitted with spline engagement to an outer circumferential surface of the shaft member in accordance with the first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIG. 1, a transmission 1 is illustrated that includes a rotating member fixing structure in accordance with a first embodiment of the present invention. FIG. 1 is a partial axial cross sectional view of the transmission 1.

As shown in FIG. 1, the transmission 1 includes an input shaft 1a, an output shaft 1b, a reverse idler shaft 1c, an output gear 1d, a differential device 2, a ring gear 4, and a plurality of synchronizing devices 5. The motive force from an engine is inputted to the input shaft 1a. The output shaft 1b and the reverse idler shaft 1c are arranged parallel to the input shaft 1a. The motive force from the engine is transmitted to the output shaft 1b using different transmission gear ratios via a plurality of gears provided to the input shaft 1a and the output shaft 1b.

The output gear 1d is coupled to the output shaft 1b. The ring gear 4 is engaged with the output gear 1d. The ring gear 4 is fixed to a case of the differential device 2 that is rotatably housed within a case of the transmission 1.

The synchronizing devices 5 are coupled to corresponding one of the input shaft 1a and the output shaft 1b. The synchronizing devices 5 are configured and arranged to selectively engage the respective gear to corresponding one of the input shaft 1a and the output shaft 1b for achieving different transmission ratios. Each of the synchronizing devices 5 includes a hub 7 and a coupling sleeve 8. For the synchronizing device 5 that is coupled to, for example, the output shaft 1b, the hub 7 is press-fitted with spline engagement to an outer circumferential surface of the output shaft 1b so that the hub 7 rotates integrally with the output shaft 1b. The coupling sleeve 8 is coupled to an outer circumferential surface of the hub 7. The coupling sleeve 8 is configured and arranged to slide in the axial direction with respect to the hub 7 so that either the left or the right side transmission gear, which is arranged to freely rotate on the output shaft 1b, is selectively fixed to the output shaft 1b. The transmission 1 and the synchronizing device 5 are conventional components that are well known in the art. Since the transmission 1 and the synchronizing device 5 are well known in the art, these structures will not be discussed or illustrated in detail herein. Rather, it will be apparent to those skilled in the art from this disclosure that the components can be any type of structure that can be used to carry out the present invention.

In the first embodiment, the hub 7 of the synchronizing mechanism 5 is fixedly coupled (e.g., press-fitted) to the output shaft 1b of the transmission 1 with spline engagement by using the rotating member fixing structure. Thus, in the first embodiment illustrated herein, the hub 7 preferably corresponds to the rotating member of the present invention, and the output shaft 1b preferably corresponds to the shaft member of the present invention.

Referring now to FIG. 2, the rotating member fixing structure in accordance with the first embodiment will be described in more detail. FIG. 2 is a simplified partial axial cross sectional view of the hub 7 and the output shaft 1b showing a state before the hub 7 is assembled with the output shaft 1b.

As shown in FIG. 2, the hub 7 includes an axial bore section 17 in which the output shaft 1b is inserted. A spline section 18 (an internal teeth part) is formed on an inner circumferential surface of the axial bore section 17. The spline section 18 has a tip surface portion 18a and a bottom surface portion 18b that are formed alternately over an entire area of the inner circumferential surface of the axial bore section 17.

The output shaft 1b includes a spline section 20 (an external teeth part) formed on the outer circumferential surface of the output shaft 1b to which the hub 7 is press-fitted with spline engagement. The spline section 20 has a tip surface portion 20a and a bottom surface portion 20b that are formed alternately over the entire outer circumferential surface of the spline section 20 of the output shaft 1b.

As shown in FIG. 2, the tip surface portion 20a of the spline section 20 on the output shaft 1b includes a first tip surface 120a and a second tip surface 121a. FIG. 4 is an enlarged partial transverse cross sectional view of the spline section 20 of the outer shaft 1b taken along a plane perpendicular to the center axis of the output shaft 1b and passes through the second tip surface 121a. In FIG. 4, the spline section 18 of the hub 7 is indicated with a long-dash-dot-dot line. As shown in FIG. 4, the spline section 20 of the output shaft 1b preferably includes a plurality of first tooth sections 121, a plurality of second tooth sections 122 and a plurality of third tooth sections 123 (only one of the first tooth sections 121, one of the second tooth sections 122 and one of the third tooth sections 123 are shown in FIG. 4) that are substantially symmetrically spaced apart in the circumferential direction of the output shaft 1b. Each of the first tooth sections 121 includes the second tip surface 121a that is configured and arranged to scratch off a part of the bottom surface portion 18b of the spline section 18 of the hub 7 as explained in more detail below. Each of the second tooth sections 122 are dimensioned to be substantially slightly fitted with the tip surface portion 18a and the bottom surface portion 18b of the spline section 18 with little interference (press-fitting margin) being formed therebetween. Each of the third tooth sections 123 includes tooth side surfaces 123a that are dimensioned with respect to corresponding side surfaces 18c of the spline section 18 so that the side surfaces 18c of the spline section 18 elastically deform upon contacting the tooth side surfaces 123a of the third tooth section 123. By providing different types of the tooth part in the spline section 20 (e.g., the first, second and third tooth sections 121, 122 and 123), the displacement between the hub 7 and the output shaft 1b in the rotational direction, as well as the localized concentrations of stress, can be prevented from occurring.

Referring back to FIG. 2, the first tip surface 120a is disposed on the side of a leading end portion (leading axial end portion) from which the hub 7 is press-fitted to the output shaft 1b. The second tip surface 121a is formed on the side of the first tip surface 120a that is opposite from the leading end portion (e.g., the right side in FIG. 2). The first tip surface 120a has a diameter D1 that is slightly larger than an inner diameter D1' of the bottom surface portion 18b of the spline section 18 of the hub 7. More specifically, the diameter D1 of the first tip surface 120a and the inner diameter D1' of the bottom surface portion 18b are set so that the bottom surface portion 18b elastically deforms in the radial direction when the bottom surface portion 18b is press-fitted to the first tip surface 120a. In other words, the initial press-fitting margin (before the hub 7 and the output shaft 1b are assembled) between the first tip surface 120a and the bottom surface portion 18b are set so that the stress caused by the effective press-fitting margin (when 7 the hub and the output shaft 1b are assembled) between the first tip surface 120a and the bottom surface portion 18b enables elastic deformation of the first tip surface 120a. The second tip surface 121a has a diameter D2 that is larger than the diameter D1 of the first tip surface 120a. As explained below, the corner part 24 functions as the margin adjusting part by ensuring that the amount of interference (press-fitting margin) at the peripheral edges is maintained less than or equal to a prescribed value.

The spline section 20 of the output shaft 1b further includes an annular groove 23 that forms a recessed shape between the first tip surface 120a and the second tip surface 121a as show in FIG. 2. The annular groove 23 separates the first tip surface 120a and the second tip surface 121a by an axial length L1 to form a clear, unambiguous boundary section between the first tip surface 120a and the second tip surface 121a. The annular groove 23 includes a substantially perpendicular surface 23a formed on the side of the second tip surface 121a that extends substantially in the radial direction of the output shaft 1b. The perpendicular surface 23a intersects a leading end portion (axial end portion) of the second tip surface 121a at a substantially right angle to form a corner part 24 (an example of the margin adjusting part of the present invention) having a sharp, abrupt edge as shown in FIG. 2. The axial length L1 of the annular groove 23 is set to be smaller than an axial length L2 of the spline section 18 formed in the axial bore section 17 of the hub 7.

Moreover, the spline section 20 of the output shaft 1b further includes a guide part 21 disposed on the leading end portion of the first tip surface 120a. The guide part 21 is slanted approximately 60° relative to a rotational axis of the output shaft 1b. Also, a tapered end surface 22 (axis displacement reducing part) is formed between the guide part 21 and the first tip surface 120a. The tapered end surface 22 is slanted at an angle that is smaller than the angle of the guide part 21 (e.g., approximately 15° to approximately 20°) relative to the rotational axis of the output shaft 1b and extends from the outer end portion (rear end portion) of the guide part 21 toward the first tip surface 120a as shown in FIG. 2. The tapered end surface 22 is preferably formed by machining the outer circumferential surface of the output shaft 1b into a tapered shape so that the tapered end surface 22 has a substantially uniform surface that gradually increases the diameter in the press-fitting direction of the hub 7 (e.g., the direction indicated by an arrow in FIG. 2). The spline section 20 is usually formed by rolling method. In the first embodiment of the present invention, the tapered end surface 22 is formed by machining to reduce excessively thick regions (shear droop or the like) on the guide part 21 produced when the spline section 20 of the output shaft 1b are formed by rolling method to form the substantially uniform, even surface.

The operation of fixing the hub 7 to the output shaft 1b by press-fitting in accordance with the rotating member fixing structure of the first embodiment will now be described.

Figure 7:
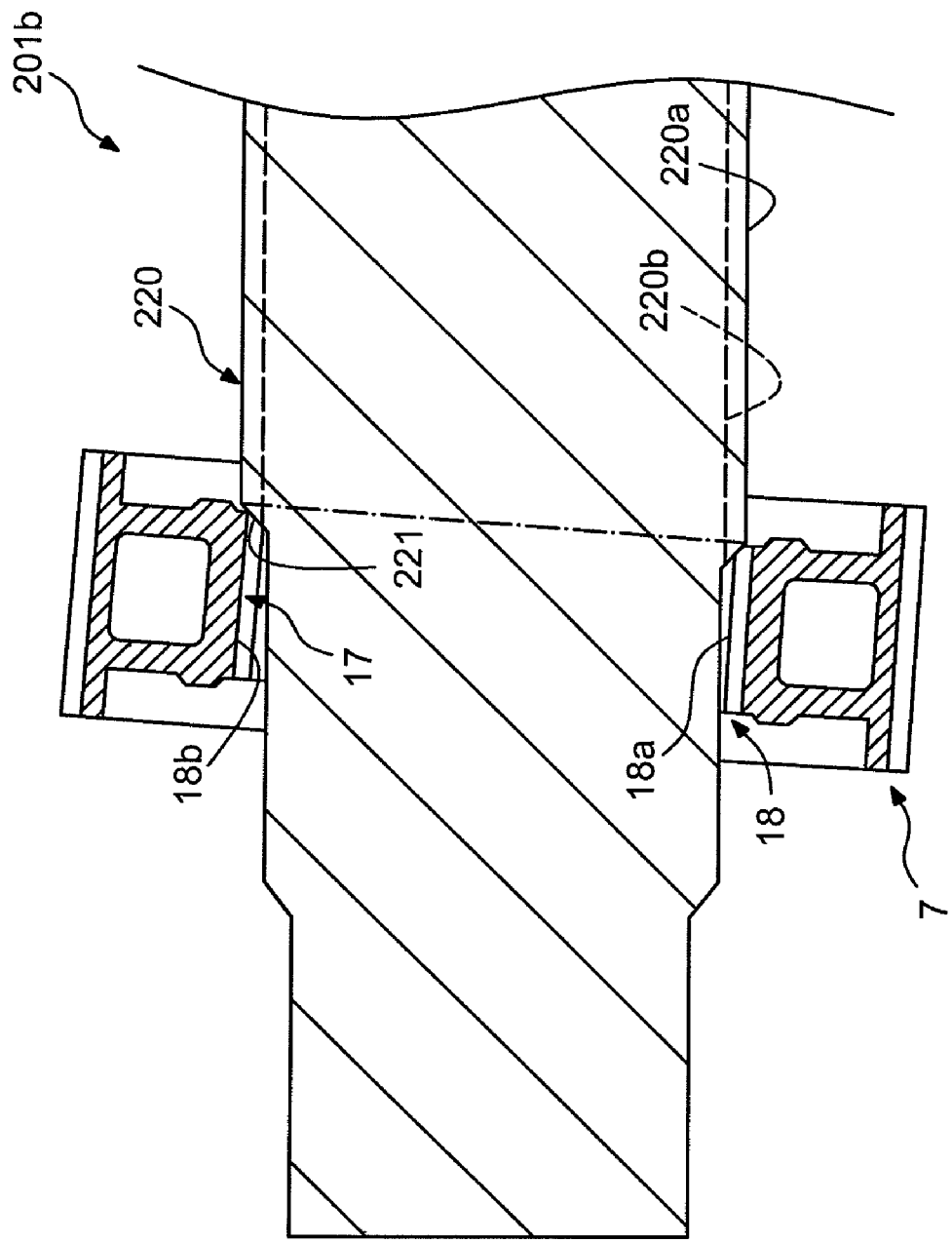
FIG. 7 is a schematic diagram illustrating a comparative example of the rotating member fixing structure in which an axis displacement between the rotating member and the shaft member occurs.

First, in order to better explain the present invention, the axis displacement (core displacement) between a rotating member and a shaft member that occurs during press-fitting when a comparative example of a rotating member fixing structure is used will be described with reference to FIG. 7. As used herein, the axis displacement refers to a displacement between a center axis of the rotating member and a center axis of the shaft member in the radial direction. In the comparative example as shown in FIG. 7, an output shaft 201b is provided only with a guide part 221 that is formed on an outer circumferential surface of the output shaft 201b. As shown in FIG. 7, the guide part 221 is slanted so that the outer diameter thereof gradually increases in the direction of the insertion of the hub 7. When the hub 7 is press-fitted to the output shaft 201b, the axial end surface of the tip surface portion 18a and the bottom surface portion 18b of the spline section 18 formed in the axial bore section 17 of the hub 7 contact the guide part 221. The surface of the guide part 221 is non-uniform due to excessively thick regions (shear droop or the like) produced when the spline section 18 and the spline section 220 are formed by rolling method. Therefore, the hub 7 is tilted as shown in FIG. 7 upon contacting the output shaft 201b, which causes the axis displacement of the hub 7 relative to the output shaft 1b. Thus, the press-fitting margin or the press-fitting allowance (interference) between the tip surface portion 220a of the spline section 20 of the output shaft 1b and the bottom surface portion 18b of the spline section 18 of the hub 7 vary at different locations in the circumferential direction in this comparison example. Accordingly, localized concentrations of stress are generated in the radial direction on the inner circumferential surface of the hub 7.

On the other hand, referring back to FIG. 2, when the hub 7 is press-fitted to the output shaft 1b in accordance with the first embodiment of the present invention, the tip surface portion 18a and the bottom surface portion 18b of the spline section 18 of the hub 7 are first brought into contact with the tapered end surface 22 of the output shaft 1b. The center axis of the hub 7 can be automatically aligned with the center axis of the output shaft 1b by using the tapered end surface 22, which has a substantially uniform tapered surface. The bottom surface portion 18b of the spline section 18 of the hub 7 then contacts the first tip surface 120a of the spline section 20 of the output shaft 1b.

As mentioned above, the outside diameter D1 of the first tip surface 120a is slightly larger than the inside diameter D1' of the bottom surface portion 18b of the hub 7. Thus, the bottom surface portion 18b is elastically deformed in the radial direction as the bottom surface portion 18b engages with the first tip surface 120a. The hub 7 is press-fitted to the output shaft 1b in a state in which the bottom surface portion 18b of the hub 7 is fitted to the first tip surface 120a without requiring a large press-fitting force.

Therefore, in the first embodiment of the present invention, the hub 7 first contacts the tapered end surface 22, and thus, the center axis of the hub 7 is automatically aligned with the center axis of the output shaft 1b. Then, the bottom surface portion 18b of the hub 7 is elastically deformed in the radial direction by the first tip surface 120a and press-fitted to the first tip surface 120a. Therefore, with the rotating member fixing structure of the first embodiment of the present invention, the axis displacement of the hub 7 relative to the output shaft 1b can be reliably suppressed.

Moreover, as mentioned above, the second tip surface 121a of the output shaft 1b is formed with the larger diameter D2 than the diameter D1 of the first tip surface 120a, and the corner part 24 is formed at a substantially right angle on the leading end portion of the second tip surface 121a. Therefore, a part of the bottom surface portion 18b of the hub 7 is scraped or scratch off by the corner part 24 when the hub 7 is further press-fitted in the press-fitting direction (e.g., the direction indicated with an arrow in FIG. 2) while the axis displacement of the hub 7 relative to the output shaft 1b is minimized. In other words, the corner part 24 and the second tip surface 121a cause a primarily non-radial deformation in the bottom surface portion 18b of the hub 7 as the corner part 24 and the second tip surface 121a engage the bottom surface portion 18b.

FIG. 3 is an enlarged partial axial cross sectional view of a spline engagement portion between the hub 7 and the output shaft 1b illustrating a state in which the hub 7 is being inserted to the output shaft 1b. Since the axial length L1 of the annular groove 23 is set to be smaller than the axial length L2 of the spline section 18 of the hub 7, the bottom surface portion 18b of the spline section 18 initially contacts the second tip surface 121a (the corner part 24) while a part of the bottom surface portion 18b is still contacting the first tip surface 120a to minimize the axis displacement of the hub 7 relative to the output shaft 1b. Since the annular groove 23 provides a clear boundary between the first tip surface 120a and the second tip surface 121a with the corner part 24, a part of the bottom surface portion 18b of the hub 7 can be actively removed or scratched off by the corner part 24 with the annular groove 23 being used as a trigger to initiate the scratching off of the part of the bottom surface portion 18b by the corner part 24 as shown in FIG. 3.

Accordingly, the hub 7 is press-fitted to the output shaft 1b in the press-fitting direction while a part of the bottom surface portion 18b of the hub 7 is scratched off by the corner part 24. The actual or effective press-fitting margin can accordingly be reduced by using the corner part 24 that actively scratches off a part of the bottom surface portion 18b of the hub 7. Since a part of the bottom surface portion 18b is effectively scratched off by the corner part 24, the stress imparted between the bottom surface portion 18b and the second tip surface 121a after the hub 7 and the output shaft 1b are press-fitted together is substantially reduced as compared to a conventional fixing structure in which the bottom surface portion of the internal teeth of the rotating member is plastically and/or elastically deformed in the radial direction by the top surface portion of the external teeth of the shaft member. In other words, in the first embodiment of the present invention, an initial press-fitting margin (before the hub 7 and the output shaft 1b are assembled) can be adjusted or reduced to the effective press-fitting margin (after the hub 7 and the output shaft 1b are assembled) so that the variation in the effective press-fitting margin due to the axis displacement of the hub 7 relative to the output shaft 1b does not increase beyond a prescribed value, which is a value substantially close to zero. As a result, the occurrence of localized concentrations of stress can be minimized at the base portions of the spline section 18 of the hub 7 and the spline section 20 of the output shaft 1b, especially in the radial direction on the inner circumferential surface of the hub 7. Therefore, the hub 7 can be reliably fixed to the outer circumferential surface of the output shaft 1b so that the hub 7 cannot rotate with respect to the output shaft 1b.

Moreover, since the first tip surface 120a and the second tip surface 121a formed on the outer circumferential surface of the output shaft 1b can be correctly and precisely shaped during machining, the press-fitting margin can be reliably adjusted.

Figure 5:
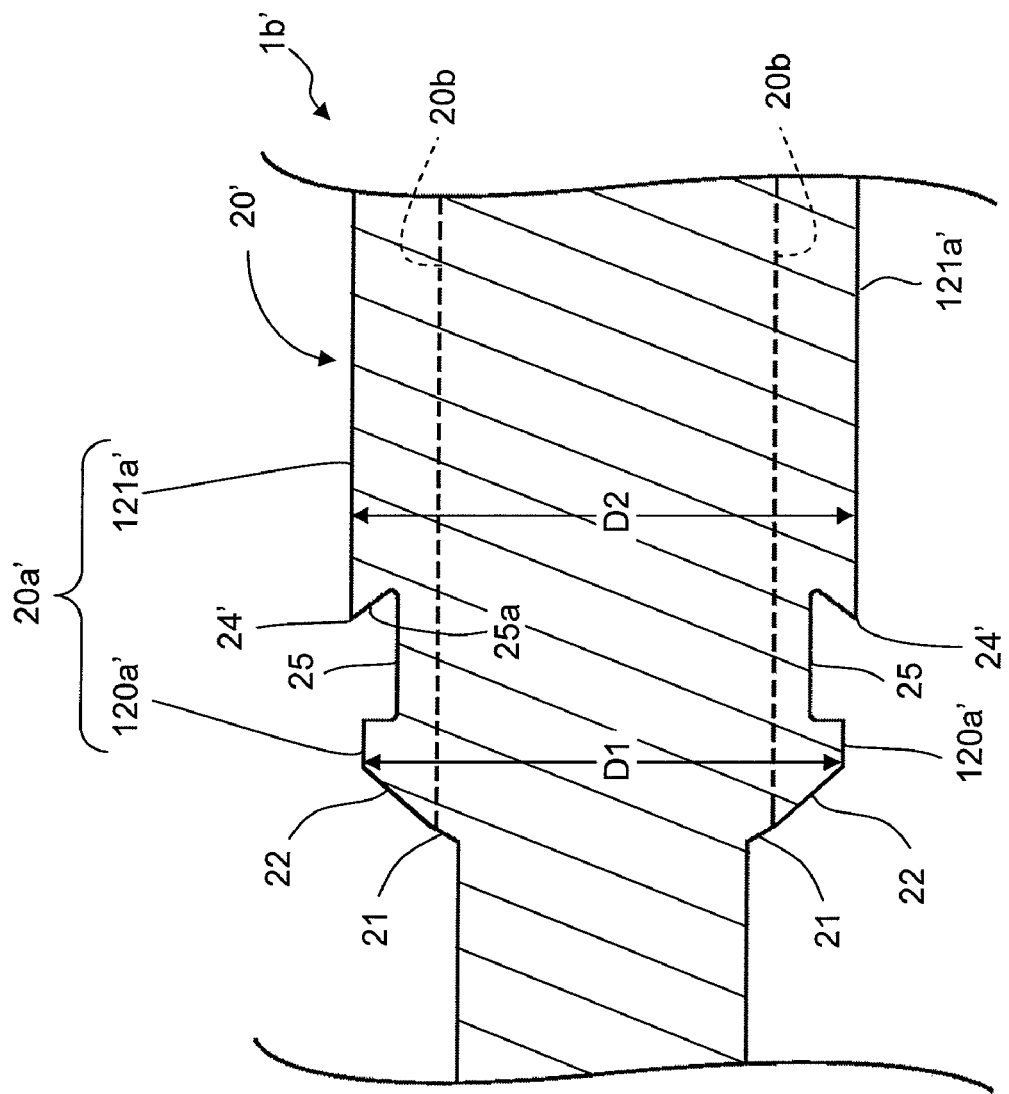
FIG. 5 is an enlarged axial cross sectional view of a first modified structure of the shaft member in the rotating member fixing structure in accordance with the first embodiment of the present invention.

FIG. 5 is a partial axial cross sectional view of an output shaft 1b' in accordance with a first modified structure of the rotating member fixing structure of the present invention. In the output shaft 1b' includes a notch 25 formed between the first tip surface 120a' and the second tip surface 121a'. The notch 25 forms a recessed shape part extending over an entire circumference the output shaft 1b' to separate the first tip surface 120a' and the second tip surface 121a'. Moreover, the notch 25 includes a slanted surface 25a adjacent to the leading end portion (axial end portion) of the second tip surface 121a'. The slanted surface 25a is slanted toward the first tip surface 120a' so that a radial outer end section of the slanted surface 25a is disposed closer to the first tip surface 120a' than a radial inner end section of the slanted surface 25a as shown in FIG. 5. Therefore a corner part 24' formed at an intersection between the leading end portion of the second tip surface 121a' and the slanted surface 25a has an acute angle as shown in FIG. 5.

Since the corner part 24' forms a sharp, abrupt edge having the acute angle, a part of the bottom surface portion 18b of the hub 7 (shown in FIG. 2) can be more reliably scratched off by the acute corner part 24' during press-fitting, and thus, the press-fitting margin can be better adjusted. The shape of the notch 25 is not limited to a groove.

Figure 6:
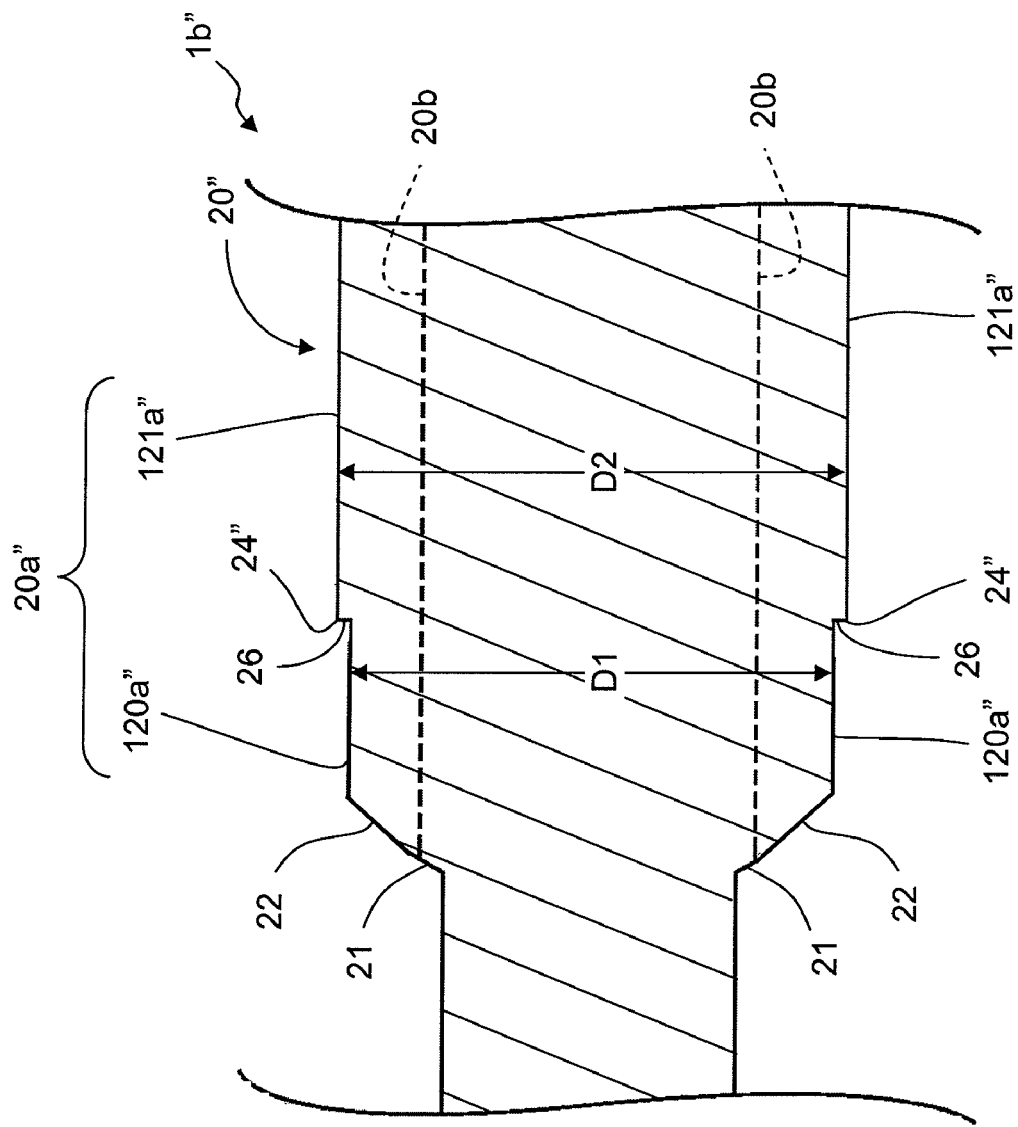
FIG. 6 is an enlarged axial cross sectional view of a second modified structure of the shaft member in the rotating member fixing structure in accordance with the first embodiment of the present invention.

FIG. 6 is a partial axial cross sectional view of an output shaft 1b" in accordance with a second modified structure of the rotating member fixing structure of the present invention. As shown in FIG. 6, the output shaft 1b" includes a first tip surface 120a" and a second tip surface 121a" that are connected by a perpendicular surface 26 that forms a substantially right angle relative to the axial direction of the output shaft 1b". The perpendicular surface 26 separates the first tip surface 120a" and the second tip surface 121a" to form a clear boundary between the first tip surface 120a" and the second tip surface 121a". A corner part 24" having an approximately right angle is formed by the leading end portion (axial end portion) of the second tip surface 121a" and the radial outer end of the perpendicular surface 26. Thus, a part of the bottom surface portion 18b of the hub 7 (shown in FIG. 2) is scratched off by a portion of the corner part 24" having a sharp, abrupt edge during press-fitting, and thus, the press-fitting margin can be adjusted.

With the rotating member fixing structure of the first embodiment, the actual press-fitting margin can accordingly be substantially reduced to zero when scratching off a part of the bottom surface portion 18b of the spline of the hub 7 by the corner part 24 (or 24' or 24") formed on the output shaft 1b (or 1b' or 1b"). Therefore, the hub 7 can be press-fitted and fixed to the output shaft 1b (or 1b' or 1b") while the occurrence of localized concentrations of stress is minimized.

The boundary section between the first tip surface 120a and the second tip surface 121a can also be formed as V-shaped groove or the like in order to give a definite shape to the boundary section between the first tip surface 120a and the second tip surface 121a of the output shaft 1b.

In the first and second modified structures illustrated in FIGS. 5 and 6, the parts of the modified structures of the output shafts 1b' and 1b" that are identical to the parts of the structure illustrated in FIG. 2 are given the same reference numerals as the parts illustrated in FIG. 2. Moreover, the descriptions of the parts of the modified structures illustrated in FIGS. 5 and 6 that are identical to the parts illustrated in FIG. 2 may be omitted for the sake of brevity. The parts illustrated in FIGS. 5 and 6 that differ from the parts illustrated in FIG. 2 are indicated with a single prime (') or a double prime (").

Although the first embodiment of the present invention is explained in which the spline section 20 on the outer circumferential surface of the output shaft 1b and the spline section 18 on the inner circumferential surface of the axial bore section 17 are press-fitted together, the present invention is not limited to arrangements using the spline engagement. For example, the outer circumferential surface of the output shaft 1b can be provided with a protrusion that functions as an external teeth part, and the axial bore section 17 of the hub 7 can be provided with a groove-shaped internal teeth part into which the protrusion of the output shaft 1b fits. In such case, the first tip surface 120a and the second tip surface 121a can be formed on the protrusion of the output shaft 1b. Therefore, the press-fitting margin can be adjusted while using the corner part 24 for scratching-down a groove part of the groove-shaped internal teeth part, and the hub 7 can be press-fitted to the output shaft 1b. In other words, a structure in which the external teeth part of the output shaft (shaft member) is press-fitted while scratching down the internal teeth part of the axial bore section 17 can be utilized to carry out the present invention.

In the first embodiment of the present invention, a part of the bottom surface portion 18b of the internal teeth part formed on the inner circumferential surface of the hub 7 is scratched off by a tip surface portion (the second tip surface 121a) of the external teeth part formed on the outer circumferential surface of the output shaft 1b. In other words, in the first embodiment of the present invention, the corner part 24, which is configured and arranged to adjust the press-fitting margin to be less than or equal to the prescribed value, is formed on the spline section 20 of the output shaft 1b which has a higher shape precision than the axial bore section 17 of the hub 7. However, the reverse arrangement, in which a part of a tip surface portion (the second tip surface 121a) of the external teeth part formed on the outer circumferential surface of the output shaft 1b is scratched off by the bottom surface portion 18b of the internal teeth part formed on the inner circumferential surface of the hub 7, can be used as long as the bottom surface portion 18b can be correctly and precisely shaped. The bottom surface portion 18b in such case can be formed to include a first bottom surface formed toward the forward end in the press-fitting direction and a second bottom surface formed toward the rear end in the press-fitting direction with the second bottom surface having a slightly smaller diameter than the first bottom surface. An annular groove can be formed on the inner circumferential surface of the axial bore section 17 of the hub 7 between the first and second bottom surfaces to form a clear boundary section therebetween. The tip surface portion 20a of the external teeth part formed on the outer circumferential surface of the output shaft 1b is thereby actively cut down by the second bottom surface of the hub 7, and the actual press-fitting margin can be reduced.

Second Embodiment

Figure 8:
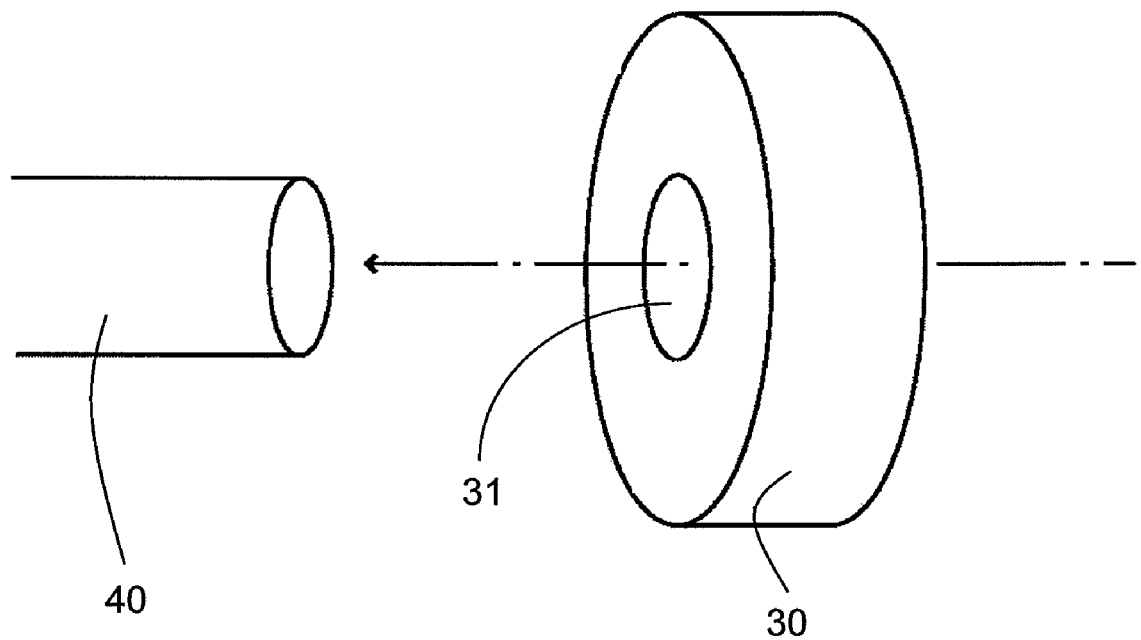
FIG. 8 is a simplified perspective view of a rotating member and a shaft member of a rotating member fixing structure in accordance with a second embodiment of the present invention.
Figure 9:
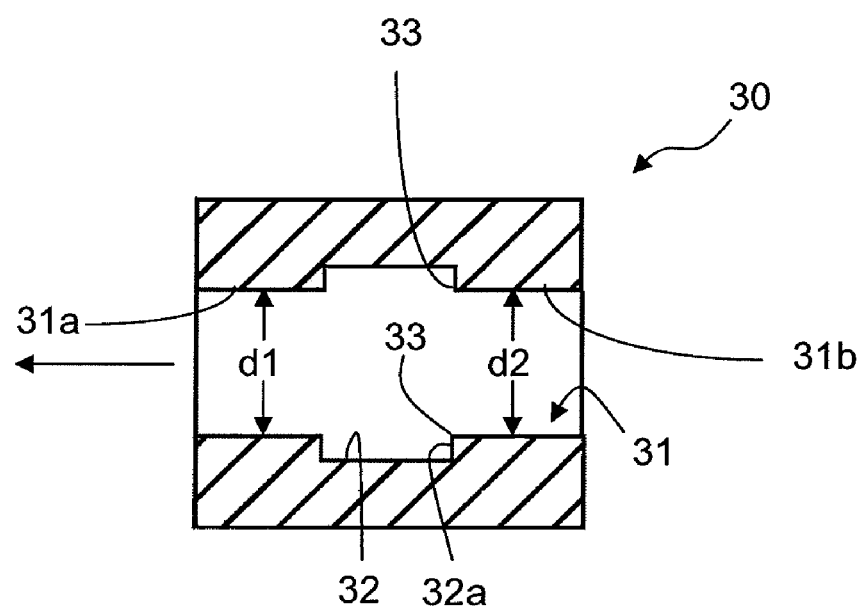
FIG. 9 is an enlarged partial axial cross sectional view of the rotating member in accordance with the second embodiment of the present invention.

Referring now to FIGS. 8 and 9, a rotating member fixing structure in accordance with a second embodiment will now be explained. Moreover, the descriptions of the parts of the second embodiment that are identical to the parts of the first embodiment may be omitted for the sake of brevity.

In the rotating member fixing structure of the second embodiment illustrated in FIG. 8, a cylindrical rotating member 30 is press-fitted and fixed to a cylindrical shaft member 40. The cylindrical rotating member 30 includes an axial bore section 31. The axial bore section 31 is provided with a first axial bore portion 31a having an inner diameter d1 and a second axial bore portion 31b having an inner diameter d2 that is smaller than the diameter d1 of the first axial bore portion 31a as shown in an enlarged axial cross sectional view of the cylindrical rotating member 30 in FIG. 9. The axial bore section 31 further includes an annular groove 32 formed between the first axial bore portion 31a and the second axial bore portion 31b. The annular groove 32 has a larger inner diameter than the diameters d1 and d2. The annular groove 32 includes a perpendicular surface 32a disposed adjacent to the second axial bore portion 31b that extends substantially perpendicular to a radial direction of the cylindrical rotating member 30. A corner part 33 is formed at a substantially right angle by the inner end of the perpendicular surface 32a and the leading end portion (axial end portion) in a press-fitting direction (the direction indicated by an arrow in FIGS. 8 and 9) of the second axial bore portion 31b.

With the rotating member fixing structure of the second embodiment, when the first axial bore portion 31a begins to be press-fitted to the shaft member 40, the first axial bore portion 31a is elastically deformed. Then, the corner part 33 is press-fitted while gradually scratching off the outer circumferential surface of the shaft member 40 when press-fitting continues in the press-fitting direction. Therefore, the actual press-fitting margin can be reduced due to the scratching-down by the corner part 33, and the rotating member 30 is press-fitted and fixedly coupled to the outer circumferential surface of the shaft member 40 such that the rotating member 30 cannot rotate with respect to the shaft member 40.

In the second embodiment illustrated in FIGS. 8 and 9, the inner diameter d1 of the first axial bore portion 31a is arranged to be slightly smaller than an outer diameter of the shaft member 40. Therefore, the first axial bore portion 31a is elastically deformed when press-fitting is initiated, whereby the axis displacement between the shaft member 40 and the rotating member 30 can be effectively minimized.

According to the rotating member fixing structure of the present invention, a margin adjusting part (e.g., the corner part 24, 24' or 24" or the corner part 33) is formed on one of the shaft member (e.g., the output shaft 1b, 1b' or 1b" in the first embodiment) and the rotating member (e.g., the rotating member 30 in the second embodiment), and the margin adjusting part is configured and arranged to adjust the press-fitting margin between the axial bore section (e.g., the axial bore section 17 in the first embodiment or the axial bore section 31 in the second embodiment) and the shaft member (e.g., the output shaft 1b, 1b' or 1b" in the first embodiment or the shaft member 40 in the second embodiment) to be less than or equal to a prescribed value when the rotating member is press-fitted to the shaft member. Therefore, the occurrence of localized concentrations of stress due to press-fitting the shaft member and the axial bore section of the rotating member can be minimized by providing the margin adjusting part. Thus, the strength and durability of the internal teeth part of the rotating member can be improved.

The margin adjusting part is formed on one of the shaft member (e.g., the output shaft 1b, 1b' or 1b" in the first embodiment) and the axial bore section of the rotating member (e.g., the axial bore section 31 of the rotating member 30 in the first embodiment) which is shaped with tighter manufacturing tolerances (i.e., manufactured or fabricated with higher precision). Therefore, the press-fitting margin can be adjusted by using the more precisely shaped member with the tighter manufacturing tolerance, which allows the press-fitting margin to be reliably held to be less than the prescribed value.

The margin adjusting part is configured to adjust the press-fitting margin by scratching down one of the axial bore section of the rotating member (e.g., the hub 7 of the first embodiment) and the shaft member (e.g., the shaft member 40 in the second embodiment) using the other one of the shaft member (e.g., the output shaft 1b, 1b' or 1b") and the axial bore section of the rotating member (e.g., the rotating member 30) when the rotating member is press-fitted to the shaft member. Therefore, the press-fitting margin can be adjusted using a simple configuration in which a part of one of the shaft member and the axial bore section is merely scratched off using the other one of the axial bore section and the shaft member.

The axial bore section (e.g., the axial bore section 17) includes an internal teeth part (e.g., the spline section 18) formed in the axial bore section, the shaft member (e.g., the output shaft 1b, 1b' or 1b") includes an external teeth part (e.g., the spline section 20) formed on an outer circumferential surface of the shaft member. The rotating member (e.g., the hub 7) is fixed to the shaft member by press-fitting the internal teeth part and the external teeth part. Therefore, the rotating member can be fixedly coupled to the shaft member so that the rotating member cannot rotate with respect to the shaft member.

The margin adjusting part is configured to adjust the press-fitting margin by scratching off a part of a bottom surface (e.g., the bottom surface portion 18b) of the internal teeth part by the tip surface (e.g., the second tip surface 121a) of the external teeth part when the bottom surface of the internal teeth part and the tip surface of the external teeth part are press-fitted together. Therefore, in a structure in which the bottom surface of the internal teeth part and the tip surface of the external teeth part are press-fitted together, the tip surface of the external teeth part, which is more readily shaped with precision, is press-fitted while scratching down the bottom surface of the internal teeth part, is used as an edge that cuts into the bottom surface of the internal teeth-part. Therefore, the press-fitting margin can be easily and reliably held to be less than the prescribed value. As a result, the occurrence of localized concentrations of stress can be minimized using a simple structure.

The tip surface of the external teeth part (e.g., the spline section 20) includes a first tip surface (e.g., the first tip surface 120a) formed at a leading end portion from which the rotating member is inserted and a second tip surface (e.g., the second tip surface 121a) formed on a side of the first tip surface that is opposite from the leading end portion. The second tip surface has a larger diameter than the first tip surface. The margin adjusting part includes a boundary section that clearly defines a boundary between the first tip surface and the second tip surface to adjust the press-fitting margin by scratching off a part of the bottom surface (e.g., the bottom surface portion 18b of the spline section 18 of the hub 7) using the second tip surface using the boundary section as a trigger. Therefore, a part of the bottom surface of the internal teeth part can be reliably scratched off using the second tip surface because the boundary section is formed with a clearly defined shape. As a result, the press-fitting margin can be more reliably held to less than the prescribed value, and the occurrence of localized concentrations of stress can be reliably controlled.

A notch (e.g., the annular groove 23 or the notch 25) is disposed between the first tip surface (e.g., the first tip surface 120a or 120a') and the second tip surface (e.g., the second tip surface 121a or 121a'). Therefore, the boundary section is formed with a clearly defined shape using a simple configuration.

The notch is an annular groove (e.g., the annular groove 23) formed on the outer circumferential surface of the shaft member (e.g., the output shaft 1b). Therefore, the boundary section can be formed with a clearly defined shape more easily.

Alternatively, a perpendicular surface (e.g., a perpendicular surface 26) is formed between the first tip surface (e.g., the first tip surface 120a") and the second tip surface (e.g., the second tip surface 121a"). Therefore, the boundary section can be formed with a clearly defined shape using a simple configuration.

One of the shaft member and the rotating member (e.g., the output shaft 1b or the rotating member 30) includes an axis displacement reducing part (e.g., the tapered end surface 22 or the first axial bore portion 31a) that is configured and arranged to minimize an axis displacement of the rotating member relative to the shaft member. Therefore, the press-fitting margin can be better held to be less than the prescribed value because the axis displacement of the rotating member relative to the shaft member can be minimized.

The axis displacement reducing part includes a tapered end surface (e.g., the tapered end surface 22) on the leading end portion having a substantially uniform surface that gradually increases in the inserting direction of the rotating member. The axis displacement reducing part contacts the tip surface of the internal teeth part with the substantially uniform surface when the rotating member is press-fitted to the shaft member. Therefore, the axis displacement can be minimized using a simple configuration.

The substantially uniform surface is formed by machining. Therefore, the substantial uniformity of the surface can be readily ensured.

The first tip surface is formed having a diameter large enough to elastically deform the bottom surface; and the axis displacement reducing part minimizes the axis displacement of the rotating member relative to the shaft member using the first tip surface and the end surface formed into a tapered shape. Therefore, the axis displacement of the rotating member relative to the shaft member can be minimized more reliably.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rotating member fixing structure comprising:
   a shaft member having an external teeth part formed on an outer circumferential surface; and
   a rotating member having an internal teeth part formed on an internal circumferential surface of an axial bore section, the rotating member being fixedly coupled to the shaft member by press-fitting a bottom surface portion of the internal teeth part of the rotating member and a tip surface portion of the external teeth part of the shaft member,
   the shaft member including a margin adjusting part dimensioned to scratch off the bottom surface portion of the internal teeth part of the rotating member by the tip surface portion of the external teeth part of the shaft member to reduce a press-fitting margin between the shaft member and the axial bore section of the rotating member from an initial press-fitting margin to an effective press-fitting margin that is less than or equal to a prescribed value when the bottom surface portion of the internal teeth part and the tip surface portion of the external teeth part are press-fitted together, the tip surface portion of the external teeth part of the shaft member including:
- a first tip surface extending from a leading axial end portion of the external teeth part from which the rotating member is attached to the shaft member, and
- a second tip surface formed on a side of the first tip surface opposite from the leading axial end portion of the external teeth part, the second tip surface having a larger diameter than the first tip surface, the margin adjusting part including a boundary section that separates the first tip surface and the second tip surface, the margin adjusting part being dimensioned to use the boundary section as a trigger to initiate scratching off of the part of the bottom surface portion of the internal teeth part of the rotary member by the second tip surface when the bottom surface portion of the internal teeth part and the tip surface portion of the external teeth part are press-fitted together.

2. The rotating member fixing structure according to claim 1, wherein
the boundary section includes a notch disposed between the first tip surface and the second tip surface to separate the first tip surface and the second tip surface.

3. The rotating member fixing structure according to claim 2, wherein
the notch of the boundary section includes an annular groove formed on the outer circumferential surface of the shaft member.

4. The rotating member fixing structure according to claim 2, wherein
the notch of the boundary section includes a slanted surface disposed adjacent to the second tip surface, the slanted surface being slanted so that a radial outer end section of the slanted surface is disposed closer to the first tip surface than a radial inner end section of the slanted surface.

5. The rotating member fixing structure according to claim 1, wherein
the boundary section includes a perpendicular surface disposed between the first tip surface and the second tip surface to separate the first tip surface and the second tip surface,
the perpendicular surface being oriented substantially perpendicular to the first and second tip surfaces.

6. The rotating member fixing structure according to claim 1, wherein
the boundary section includes a surface that intersects the second tip surface at an angle to form a corner part between the boundary section and the second tip surface.

7. The rotating member fixing structure according to claim 1, wherein
the shaft member includes an axis displacement reducing part dimensioned to suppress an axis displacement between the rotating member and the shaft member when the rotating member and the shaft member are press-fitted together.

8. The rotating member fixing structure according to claim 7, wherein
the axis displacement reducing part includes a tapered surface formed on the leading axial end portion of the external teeth part of the shaft member, the tapered surface having a substantially uniform surface with a diameter thereof being gradually increased in an inserting direction of the rotating member to suppress the axis displacement between the rotating member and the shaft member.

9. The rotating member fixing structure according to claim 8, wherein
the substantially uniform surface of the axis displacement reducing part is formed by machining.

10. The rotating member fixing structure according to claim 8, wherein
the first tip surface of the external teeth part of the shaft member has a diameter larger than a diameter of the bottom surface portion of the internal teeth part of the rotating member so that the bottom surface portion elastically deforms when the bottom surface portion and the first tip surface are press-fitted together, and
the axis displacement reducing part is dimensioned to suppress the axis displacement between the rotating member and the shaft member using the tapered surface and the first tip surface.

11. The rotating member fixing structure according to claim 1, wherein
the external teeth part of the shaft member further includes first, second and third tooth sections that are spaced apart in a circumferential direction of the shaft member, the first tooth section including the margin adjusting part, the second tooth section being dimensioned to be fitted with the internal teeth part of the rotating member, and the third tooth section being dimensioned to be press-fitted with the internal teeth part of the rotating member to cause a part of the internal teeth part to be elastically deformed.

* * * * *